US009378283B2

(12) United States Patent
Batraski et al.

(10) Patent No.: US 9,378,283 B2
(45) Date of Patent: Jun. 28, 2016

(54) INSTANT SEARCH RESULTS WITH PAGE PREVIEWS

(75) Inventors: Ethan Batraski, Foster City, CA (US); Shenhong Zhu, Santa Clara, CA (US); Olivia Franklin, San Francisco, CA (US); Hui Wu, Fremont, CA (US); Mingtian Liu, San Jose, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 149 days.

(21) Appl. No.: 13/453,018

(22) Filed: Apr. 23, 2012

(65) Prior Publication Data

US 2013/0282749 A1   Oct. 24, 2013

(51) Int. Cl.
*G06F 17/30* (2006.01)

(52) U.S. Cl.
CPC ............................. *G06F 17/30864* (2013.01)

(58) Field of Classification Search
CPC .......... G06F 17/30864; G06F 17/3064; G06F 17/30867; G06F 17/30696; G06F 17/30905; Y10S 707/99933
See application file for complete search history.

(56) References Cited

U.S. PATENT DOCUMENTS

| | | | | |
|---|---|---|---|---|
| 6,643,641 | B1* | 11/2003 | Snyder | 707/709 |
| 6,829,617 | B2* | 12/2004 | Sawdon | G06F 11/1435 |
| 7,200,820 | B1* | 4/2007 | Stephens | G06F 17/30696 707/999.003 |
| 7,418,661 | B2* | 8/2008 | Brandenberger | G06F 17/3089 707/E17.116 |
| 7,689,933 | B1* | 3/2010 | Parsons | G06F 3/0482 715/200 |
| 8,332,748 | B1* | 12/2012 | Karam | 715/246 |
| 8,732,571 | B2* | 5/2014 | Jain | G06F 17/30905 715/234 |
| 2002/0073058 | A1* | 6/2002 | Kremer et al. | 707/1 |
| 2006/0248078 | A1* | 11/2006 | Gross et al. | 707/5 |
| 2006/0265417 | A1* | 11/2006 | Amato et al. | 707/102 |
| 2006/0277167 | A1* | 12/2006 | Gross et al. | 707/3 |
| 2007/0070066 | A1* | 3/2007 | Bakhash | 345/419 |
| 2007/0276811 | A1* | 11/2007 | Rosen | 707/3 |
| 2008/0072139 | A1* | 3/2008 | Salinas | G06F 17/30905 715/238 |
| 2008/0134093 | A1* | 6/2008 | Dharmarajan | G06F 17/30864 715/838 |
| 2008/0140712 | A1* | 6/2008 | Weber et al. | 707/104.1 |
| 2008/0147653 | A1* | 6/2008 | Collier | 707/6 |
| 2009/0006543 | A1* | 1/2009 | Smit | G06F 17/30864 709/203 |
| 2009/0024962 | A1* | 1/2009 | Gotz | G06F 17/30884 715/838 |
| 2009/0249229 | A1* | 10/2009 | Offer | G06Q 30/0255 715/760 |
| 2010/0082604 | A1* | 4/2010 | Gutt et al. | 707/721 |
| 2010/0146012 | A1* | 6/2010 | Beaudreau et al. | 707/803 |
| 2010/0274775 | A1* | 10/2010 | Fontes | G06F 17/30991 707/706 |
| 2012/0047134 | A1* | 2/2012 | Hansson et al. | 707/731 |
| 2012/0054669 | A1* | 3/2012 | Refuah et al. | 715/783 |

OTHER PUBLICATIONS

Muriel Foulonneau, et al., "Automated Capture of Thumbnails and Thumbshots for Use by Metadata Aggregation Services", http:t-twww.dlib.orgtdlibljanuaryO61foulonneautOlfoulonneau.html; D-Lib Magazine, Jan. 2006, vol. 12, No. 1, 14 pgs.*

* cited by examiner

*Primary Examiner* — Polina Peach
(74) *Attorney, Agent, or Firm* — Pillsbury Winthrop Shaw Pittman LLP

(57) ABSTRACT

Methods, systems, and programming for providing search previews is disclosed. At least one input is received. At least one query suggestion is generated based on the at least one input. The at least one query suggestion is displayed in a first display area. At least one web page preview is generated based on the at least one input. The at least one web page preview is displayed in a second display area. Each web page preview is viewable and actionable.

21 Claims, 14 Drawing Sheets

INSTANT SEARCH RESULTS WITH PAGE PREVIEWS

FIELD

The present disclosure relates to methods, systems and programming for providing search previews. More particularly, the present disclosure is directed to methods, systems, and programming for providing query suggestions and web page previews as search results.

BACKGROUND OF THE INVENTION

When users of web search engines or browsers enter search requests, snapshots corresponding to the web pages of the search requests may be produced. However, it is often the case that the snapshots do not offer useful information and do not reflect the contents of the original web pages. In certain circumstances, the snapshots themselves may be low quality images or simply snapshots of error pages due to certain web pages being removed, or being under maintenance. Thus, when users view these results, they may not see results that produce web pages that can be navigated to for useful information. Additionally, users may need to spend time sifting through results to find results with snapshots that are useable and offer useful information.

If high quality snapshots are acquired, there is still the problem of users wanting to be sure that they are viewing refreshed. For example, a user may select a snapshot, but find that the web page being viewed is not properly represented by the snapshot. Thus, it would be beneficial for users to view snapshots of web pages that accurately reflect their associated web pages. As a result, management of web page snapshots with respect to providing search results is an important consideration to provide users with a seamless web search experience.

Additionally, search results are often provided in an fashion where navigation of results is not entirely convenient for the user. For example, search results may be displayed as a list of search results with no way for the user to determine which result is the most relevant, and which search results are associated with web pages that are active or indicative of what the user is looking for.

Search has traditionally been a serial process requiring a user to perform the following steps to potentially find a relevant search result: 1) type a search query; 2) enter search query; 3) review text-only search results page; 4) select a search result; 5) view the resulting site corresponding to the search result; 6) select browser back button to return to search results page; and 7) select another search result. This makes for a very cumbersome experience that is inefficient because a user is only able to view results after entering the full search query. Also, the longer it takes to review results, the longer it may take to modify the query appropriately to match the intent of the user. Additionally, text-based titles, abstracts, or URL search results are not effective for always conveying what the user will view when they navigate to the web page.

SUMMARY

The embodiments described herein relates to methods, systems and programming for providing search previews. More particularly, the present disclosure is directed to methods, systems, and programming for providing query suggestions and web page previews as search results.

In an embodiment a method implemented on at least one computing device, each computing device having at least one processor, storage, and a communication platform connected to a network for providing search previews, is disclosed. At least one input is received. At least one query suggestion is generated based on the at least one input. The at least one query suggestion is displayed in a first display area. At least one web page preview is generated based on the at least one input. The at least one web page preview is displayed in a second display area. Each web page preview is viewable and actionable.

In another embodiment, a rich result may be generated for display in a third display area based on the at least one input, wherein the rich result represents a targeted search result associated with the at least one input.

In another embodiment, an update is received to the at least one input. The at least one query suggestion and display thereof in the first display area is updated based on the updated at least one input. The at least one web page preview and display thereof in the second display area is updated based on the updated at least one input.

In another embodiment, generating at least one query suggestion comprises: determining an intent based on the at least one input; determining at least one query suggestion associated with the intent; and providing the at least one query suggestion for display.

In another embodiment, generating at least one web page preview comprises: determining at least one web page result based on the at least one input; determining web page snapshots associated with each of the at least one web page result; associating each web page snapshot with a web page preview of the at least one web page preview; and providing the at least one web page preview for display.

In another embodiment, the second display area including the at least one web page preview is navigable based on detection of an input within the second display area, the input associated with coordinates within the second display area.

In another embodiment, the first display area and the second display area are part of a combined display area that is invisible and embedded within a browser environment displayed on a display of a computing device, wherein the combined display area becomes visible in the browser environment in response to detection of a triggering event.

In an embodiment, a system for providing search previews is disclosed. The system includes a search query unit for receiving at least one input; a search suggestion unit for generating at least one query suggestion for display in a first display area based on the at least one input; a search results unit for generating at least one web page preview for display in a second display area based on the at least one input; and a display for displaying the at least one query suggestion in the first display area and displaying the at least one web page preview in a second display area. Each web page preview is viewable and actionable.

In another embodiment, the search results unit is further configured for generating a rich result for display in a third display area based on the at least one input, wherein the rich result represents a targeted search result associated with the at least one input.

In another embodiment, the search query unit is further configured for receiving an update to the at least one input; updating the at least one query suggestion and display thereof in the first display area based on the updated at least one input; and updating the at least one web page preview and display thereof in the second display area based on the updated at least one input.

In another embodiment, the search query unit is configured for determining an intent based on the at least one input;

determining at least one query suggestion associated with the intent; and providing the at least one query suggestion for display.

In another embodiment, the search results unit is further configured for determining at least one web page result based on the at least one input; determining web page snapshots associated with each of the at least one web page result; associating each web page snapshot with a web page preview of the at least one web page preview; and providing the at least one web page preview for display.

In another embodiment, the second display area including the at least one web page preview is navigable based on detection of an input within the second display area, the input associated with coordinates within the second display area.

In another embodiment, the first display area and the second display area are part of a combined display area that is invisible and embedded within a browser environment displayed on a display of a computing device, wherein the combined display area becomes visible in the browser environment in response to detection of a triggering event.

Other concepts relate to software for implementing adaptive application searching. A software product, in accord with this concept, includes at least one machine-readable non-transitory medium and information carried by the medium. The information carried by the medium may be executable program code data regarding parameters in association with a request or operational parameters.

In an embodiment, a machine readable and non-transitory medium having information recorded thereon for providing search previews, where when the information is read by the machine, causes the machine to receive at least one input; generate at least one query suggestion based on the at least one input; display the at least one query suggestion in a first display area; generate at least one web page preview based on the at least one input; and display the at least one web page preview in a second display area. Each web page preview is viewable and actionable.

In another embodiment, a rich result may be generated for display in a third display area based on the at least one input, wherein the rich result represents a targeted search result associated with the at least one input.

In another embodiment, an update is received to the at least one input. The at least one query suggestion and display thereof in the first display area is updated based on the updated at least one input. The at least one web page preview and display thereof in the second display area is updated based on the updated at least one input.

In another embodiment, generating at least one query suggestion comprises: determining an intent based on the at least one input; determining at least one query suggestion associated with the intent; and providing the at least one query suggestion for display.

In another embodiment, generating at least one web page preview comprises: determining at least one web page result based on the at least one input; determining web page snapshots associated with each of the at least one web page result; associating each web page snapshot with a web page preview of the at least one web page preview; and providing the at least one web page preview for display.

In another embodiment, the second display area including the at least one web page preview is navigable based on detection of an input within the second display area, the input associated with coordinates within the second display area.

In another embodiment, the first display area and the second display area are part of a combined display area that is invisible and embedded within a browser environment displayed on a display of a computing device, wherein the combined display area becomes visible in the browser environment in response to detection of a triggering event.

Additional advantages and novel features will be set forth in part in the description which follows, and in part will become apparent to those skilled in the art upon examination of the following and the accompanying drawings or may be learned by production or operation of the disclosed embodiments. The advantages of the present embodiments may be realized and attained by practice or use of various aspects of the methodologies, instrumentalities and combinations set forth in the detailed description set forth below.

DETAILED DESCRIPTION

Figure 1:
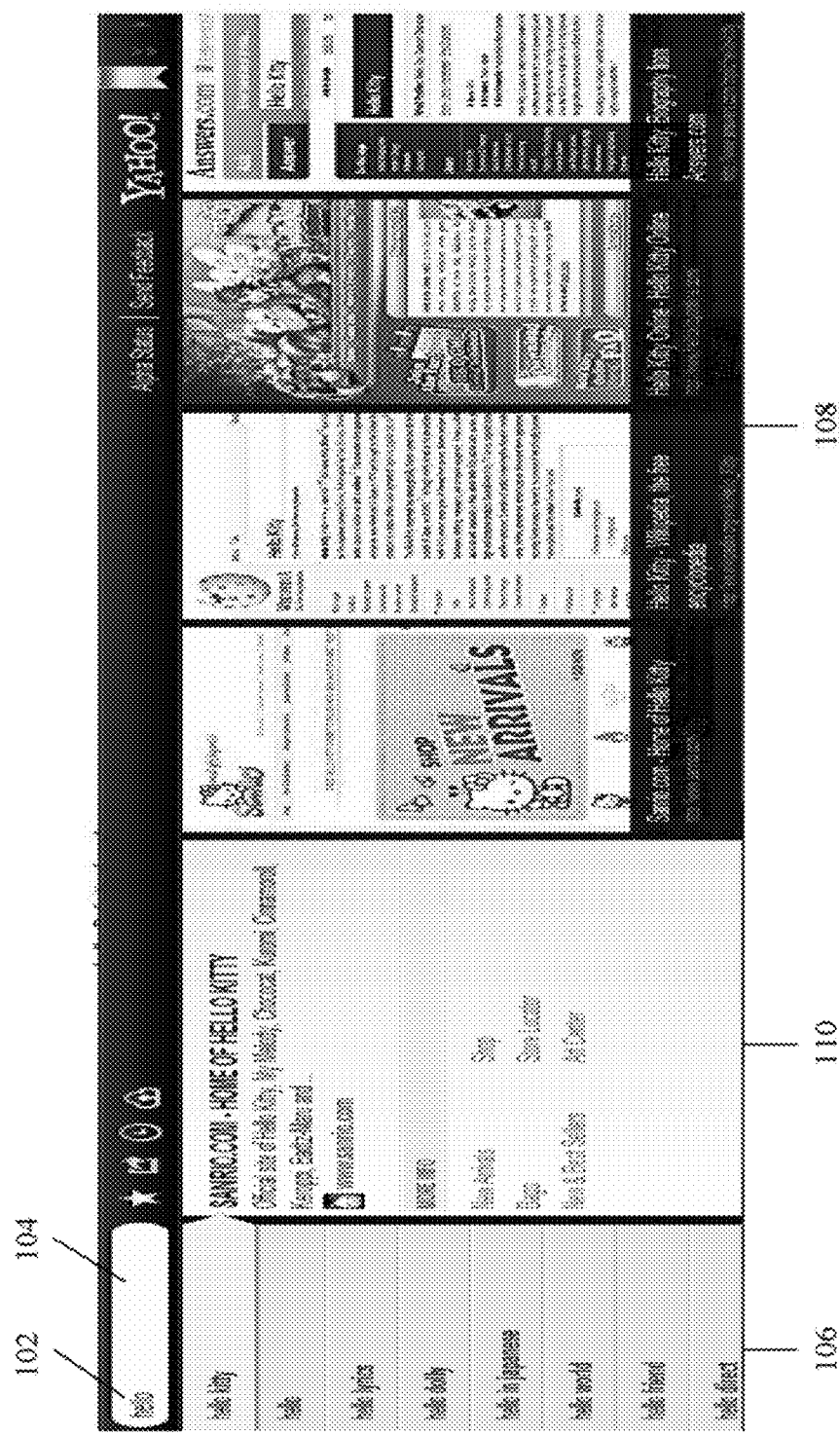
FIG. 1 depicts an exemplary view of search results including web page snapshots, query suggestions, and a rich result, in accordance with an embodiment of the present disclosure.

In the following detailed description, numerous specific details are set forth by way of example in order to provide a thorough understanding of the relevant embodiments described herein. However, it should be apparent to those skilled in the art that the present embodiments may be practiced without such details. In other instances, well known methods, procedures, components and/or circuitry have been described at a relatively high-level, without detail, in order to avoid unnecessarily obscuring aspects of the embodiments described herein.

The present disclosure relates to methods, systems and programming for providing search previews. More particularly, the present disclosure is directed to methods, systems, and programming for providing query suggestions and web page previews as search results. Page previews in the form of snapshots are rendered instantaneously or in real time as a search query input is entered. For example, as a user types in a search box, a list of query suggestions may be displayed in a first display area, a number of web page previews in the form of snapshots may be displayed in a second display area, and if applicable, a rich result will be displayed in a third display area. The query suggestions represent suggestions of search terms based on the current input in a search query input box. The rich result represents a targeted search result that is specifically associated with the selected query suggestion in first display area. The web page previews are represented by snapshots which are viewable and actionable. Each snapshot links to a corresponding web page URL, and each snapshot represents a current, updated view of that particular web page URL.

In this way, users can view search results as page previews or snapshots which represent screenshots of web pages. An instant real time experience is provided since users will see search results updated as each keystroke of their input is entered, which allows for instant gratification and a determination of whether the results are relevant to their actual search intentions. Screenshots also enable users to make a visual decision about whether or not the search result is what they are looking for.

In order to ensure that search results using web page snapshots are useful to users, not only should the web page snapshots be of high quality to represent the web pages to which they correspond, but the web page snapshots themselves should also be refreshed continuously so that the web page snapshots always reflect a direct representation of what is displayed when visiting a particular web page URL. Thus, continuously generating web page snapshots under practical constraints is the described with respect to the embodiments of the present disclosure. Different URLs may be classified and scheduled for refreshment accordingly. Once scheduled for refreshment, high quality snapshots of these URLS are generated and used as search results.

Web page snapshot quality may be evaluated in order to ensure that high quality web page snapshots are provided to users for viewing based on their search results. This ensures that users are offered useful information in the snapshots and that the snapshots reflect the current content of the web page URLs to which they correspond. As the web pages snapshots are continuously refreshed, this ensures that the snapshots are always identical in content to what is actually displayed if a user were to navigate to the corresponding web page. The web page snapshots are also actionable since each snapshot links to a corresponding to a web page URL. In classifying whether a web page snapshot is high quality, classification techniques are used to extract features of web pages, taking into account Hypertext Transfer Protocol (HTTP) responses, web page source code, and snapshot color distribution. A method to schedule refreshment of snapshots is also used to ensure that snapshots are refreshed or generated in an efficient manner.

FIG. 1 depicts an exemplary view of search results including web page snapshots, query suggestions, and a rich result, in accordance with an embodiment of the present disclosure.

An input 102 may be entered into search query box 104. An input may include a keyword, a search term, and number of characters, any number of numerals, any number of words, phrases, abbreviations, acronyms, stock ticker symbols, website addresses, or any combination thereof. In FIG. 1, the input 102 is shown as the word "hello." In a first display area 106, a plurality of query suggestions are shown. These query suggestions are generated based on the input 102 and represent common or frequently used query inputs in association with the current input 102. The query suggestions are ranked in order of relevance and based upon a determination of user intent. For example, as FIG. 1 shows an input 102 reading "hello," it has been determined that "hello kitty" is the intended search input associated with "hello."

As "hello kitty" has been selected as the intended search input, second display area 108 displays a plurality of web page previews, each web page preview in the form of a snapshot that is viewable and actionable and linking to a corresponding web page URL. These web page previews are associated with the selected query suggestion. Additionally, since a rich result is available, a third display area 110 displays a rich result associated with "hello kitty" which provides a direct link to the Sanrio homepage.

Although "hello kitty" was automatically chosen as the query suggestion for the basis of what is displayed in second display area 108 and third display area 110, a user may also, at any time, select one of the other query suggestions. Second display area 108 and third display area 110 will update accordingly based on this selection.

Furthermore, a user may wish to edit the input 102. Any additions or deletions from input 102 will cause all of first display area 106, second display area 108, and third display area 110 to update accordingly and show query suggestions, web page previews, and a rich result, respectively, that is associated with the updated input 102 in search query box 104. If no rich results are available, then third display area 110 will not be visible.

Second display area 108 is furthermore navigable based on detection of an input within second display area 108. For example, second display area 108 includes coordinates at each point within second display area 108. Detection of an input at particular coordinates within second display area 108, the input being from peripheral devices or as a result of tactile stimulation causing a capacitive, resistive, or wave input, will cause the web page previews to move such that further web page previews may be displayed.

Figure 2:
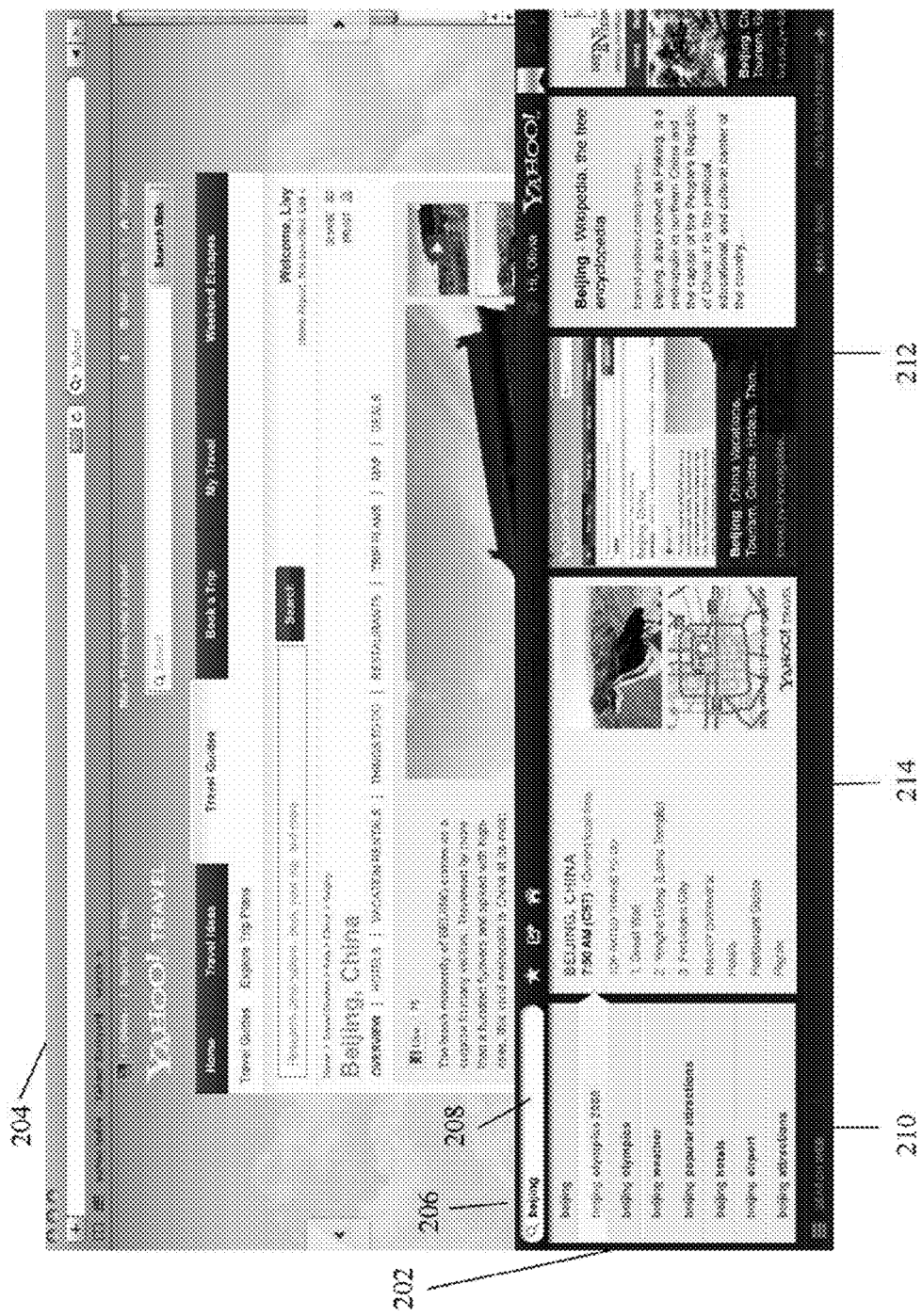
FIG. 2 depicts an exemplary view of a search results provided in a desktop or computing device browser environment, in accordance with an embodiment of the present disclosure.

FIG. 2 depicts an exemplary view of a search results provided in a desktop or computing device browser environment, in accordance with an embodiment of the present disclosure. FIG. 2 displays a search application 202 that may be provided as an overlay of a web browser 204. Thus, web browser 204 may cover an entire display area, as search application 202 may be invisible and embedded within a browser environment of web browser 204. When search application 202 receives an indication of a triggering event, such as an input from a user, search application 202 will become visible as an overlay over a portion of web browser 204's display.

Once search application 202 appears, operation of search application 202 corresponds to the operations described with respect to FIG. 1. Search application 202 includes an input 206 within search query box 208. In FIG. 2, input 206 is the city "beijing." Based on this, query suggestions are displayed in first display area 210 of search application 202. In this case, the query suggestion "beijing olympics 2008" has been selected. Thus, second display area 212 displays web page previews based on this query suggestion. Similarly, third display area 214 display a rich result corresponding with this query suggestion. As this particular rich result corresponds to a city, other information is displayed in the rich result view area, this information retrieved from certain peripheral services. For example, the rich result in third display area 214 shows the current local time, list of things to do, a representative image, and a map of the city of Beijing. All information within third display area 214 is actionable and will link a user to the appropriate web site corresponding to the information. Second display area 212 displays web page previews in the form of snapshots and is navigable based on detection of an input within second display area 212.

Selection of any of the web page previews or snapshots of second display area 212 and any of the links or images shown in the rich result within third display area 214 will cause web browser 204 to navigate to the corresponding link and display the web page associated with that link or web page URL.

Figure 3:
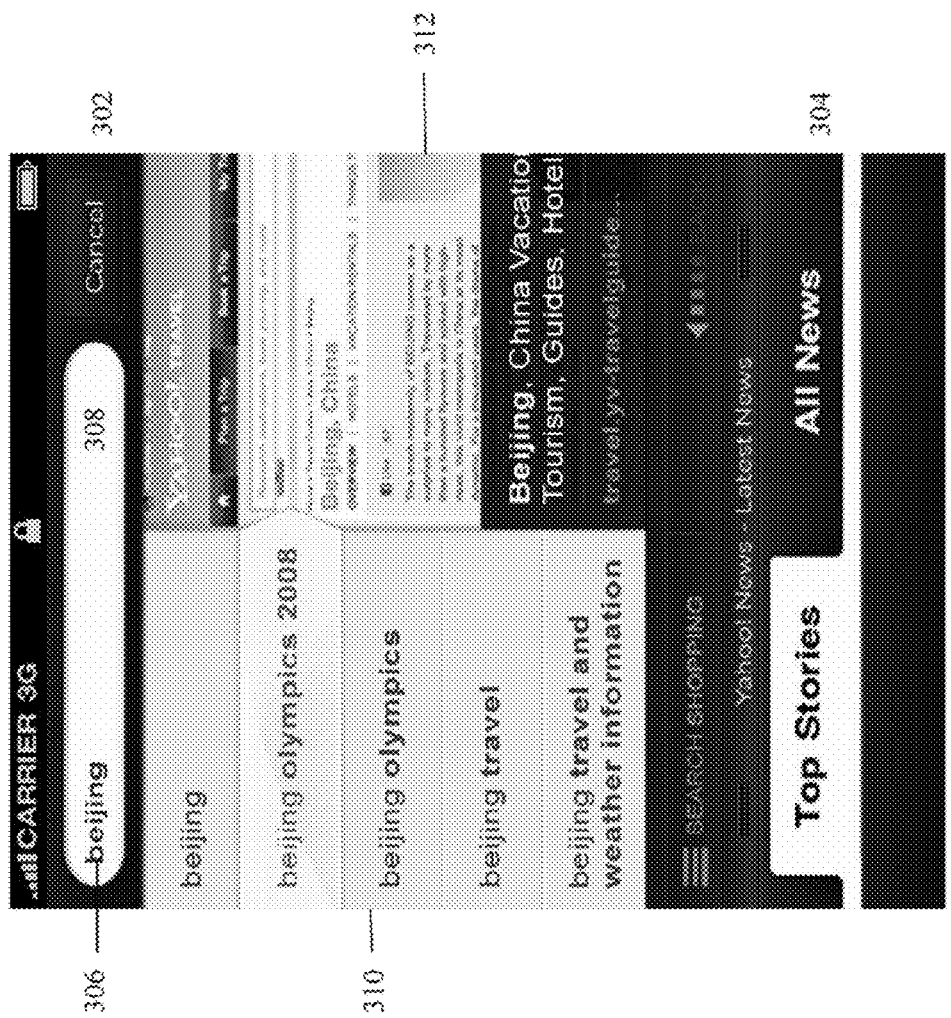
FIG. 3 depicts an exemplary view of a search results provided in a mobile or handheld device browser environment, in accordance with an embodiment of the present disclosure.

FIG. 3 depicts an exemplary view of a search results provided in a mobile or handheld device browser environment, in accordance with an embodiment of the present disclosure. FIG. 3 displays search application 302 displayed on a mobile device also provided as an overlay to a web browser 304. As a mobile device provides a smaller display area, search application 302 has been adapted to display as much information as possible. Input 306 including the text "beijing" is entered in search query box 308. Based on this, query suggestions have been displayed in first display area 310. As display space is limited on a mobile device, rich results are not displayed by search application 302 on a mobile device. Second display area 312 displays web page previews in the form of snapshots that are viewable and actionable. Thus, search application 302 demonstrates that search application 302 and all other search applications according to embodiments described herein, may adaptively remove a third display area for displaying rich results when necessary. Selection of any of the web page previews or snapshots of second display area 312 will cause web browser 304 to navigate to the corresponding link and display the web page associated with that link or web page URL.

Figure 4:
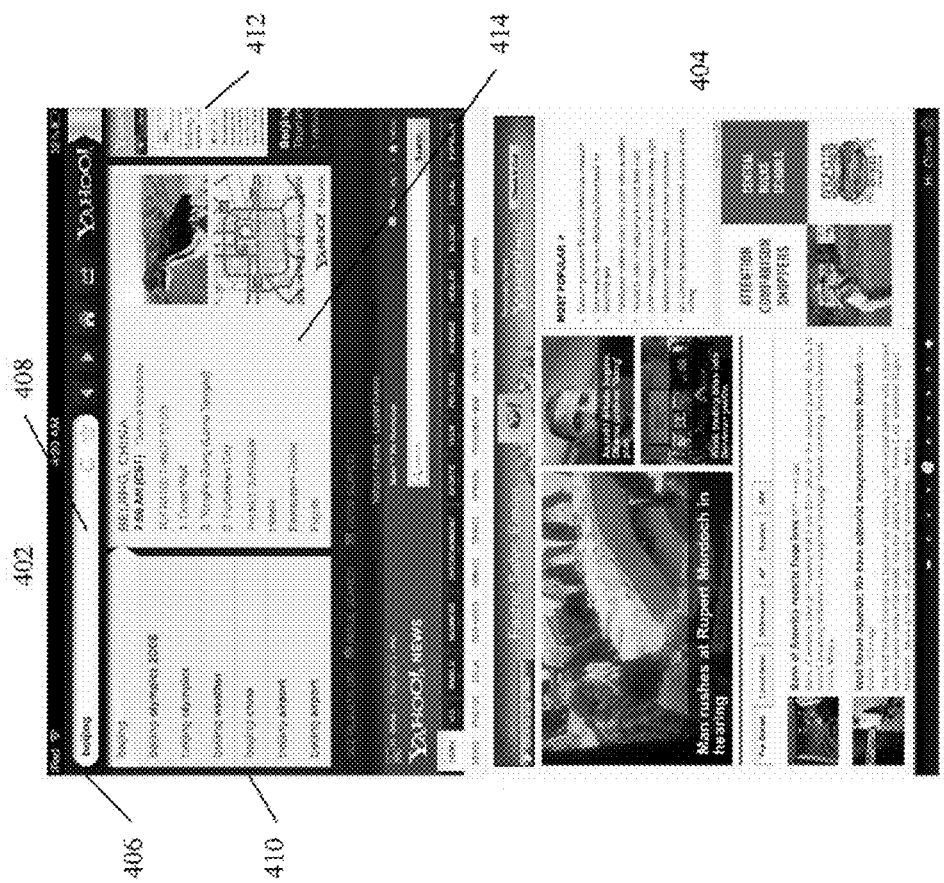
FIG. 4 depicts an exemplary view of a search results provided in a tablet device browser environment, in accordance with an embodiment of the present disclosure.

FIG. 4 depicts an exemplary view of a search results provided in a tablet device browser environment, in accordance with an embodiment of the present disclosure. FIG. 4 depicts search application 402 displayed on a tablet device, and overlaid on a web browser 404. Input 406 including the text "beijing" is entered in search query box 408. Based on this, query suggestions have been displayed in first display area 410. Second display area 412 displays web page previews in the form of snapshots that are viewable and actionable. Third display area 414 displays a rich result corresponding to the query suggestion chosen for "beijing." Selection of any of the web page previews or snapshots of second display area 412 and any of the links or images shown in the rich result within third display area 414 will cause web browser 404 to navigate to the corresponding link and display the web page associated with that link or web page URL.

Figure 5:
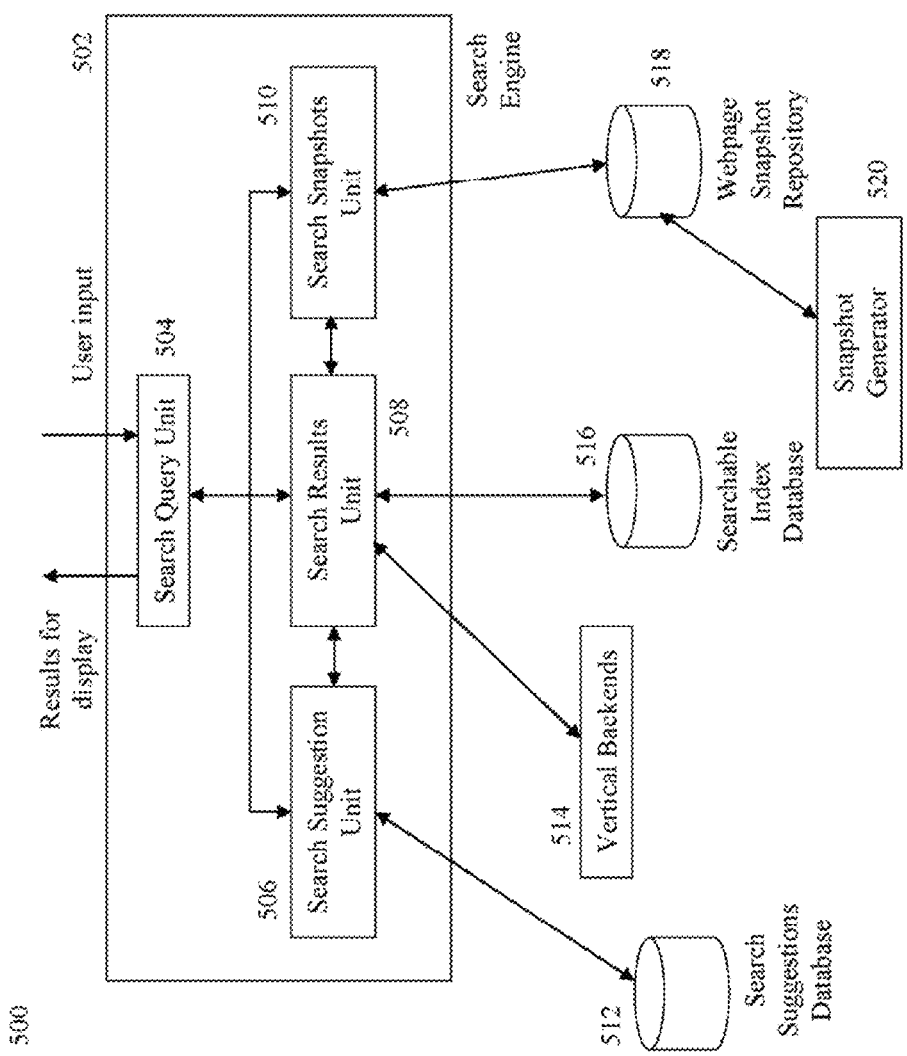
FIG. 5 depicts a high level exemplary system diagram of a system for providing search results as web page snapshots, query suggestions, and rich results in accordance to an embodiment of the present disclosure.

FIG. 5 depicts a high level exemplary system diagram of a system for providing search results as web page snapshots, query suggestions, and rich results in accordance to an embodiment of the present disclosure. FIG. 5 depicts a system 500 that communicates with an application, such as the search applications depicted and described above with respect to FIGS. 1, 2, 3, and 4. In a preferred embodiment, system 500 resides on a search engine or search engine backend. However, it is understood that certain components of functionality of system 500 may be carried out by a user device that is executing a search application that provides query suggestions, rich results, and search results in the form of web page previews represented by snapshots to users of the search application at the user device.

In an embodiment, system 500 includes a search engine 502 for receiving user input in the form of search queries and providing search results and other related data and information for display. User input may be received by search query unit 504. Input may be a keyword, a search term, and number of characters, any number of numerals, any number of words, phrases, abbreviations, acronyms, stock ticker symbols, website addresses, or any combination thereof. Search query unit 504 processes all search query requests received as user input, and communicates with search suggestion unit 506, search results unit 508, and search snapshots unit 510 to provide results in response to the search query or user input to the user. Search query unit 504 may continuously communicate with search suggestion unit 506, search results unit 508, and search snapshots unit 510 as input is received so as to provide search results to a user in real time. Both the user input and results for display are received and provided to a search application executing on a user device.

Once search query unit 504 receives input, search query unit 504 sends the input to search suggestion unit 506, search results unit 508, and search snapshots unit 510. Search suggestion unit 506 will then process the input and cross reference with search suggestions database 512 to generate search or query suggestions corresponding to the input which it can provide to search query unit 504. Search suggestions database 512 includes query suggestions based on user intent. More specifically, the query suggestions that will be generated is based upon data that has been aggregated and modeled such that the query suggestions serve as predictive indicators of the search terms or keywords that a user may want to use as the basis for their search. The generated search query suggestions are provided to search query unit 504. The query suggestions stored at search suggestions database 512 is collected through offline data mining procedures.

Concurrently, search results unit 508 analyzes the input in order to determine if there is a possible rich result corresponding to the input. Search results unit 508 may communicate with vertical backends 514 to make this determination. For example, if the input is "YHOO", then by referencing vertical backends 514, it can be determined that providing a link to a stock ticker for "Yahoo" is appropriate. In another example, if the input is "Chase Bank", then the rich result can provide a direct link to the Chase website. In yet another example, if the input is a place or location such as "California", the rich result may not only include a link to the state of California's home page, but also include details such as a map of California, and list of things to do. All of this information may be obtained from vertical backends 514 that are responsible for a variety of topics including finance, travel, world news, sports, entertainment, and any other topics of interest. The rich result is provided to search query unit 504

Search results unit 508 also analyzes the input in comparison with a searchable index database 516. Searchable index database 516 provides web page URLs that may correspond with the input. These web page URLs are used as the basis for providing web page previews in the form of snapshots. Searchable index database 516 is built during offline data mining and processing of search logs and web pages.

If query suggestions are available, a default query suggestion is used as the basis for providing results to a user device. Thus, once a default query suggestion is automatically selected by a user or once a user selects a query suggestion, search query unit 504 will simultaneously receive the web page URLs from search results unit 508 and also request snapshots corresponding to these web page URLS from search snapshots unit 510. Search snapshots unit 510 searches a webpage snapshot repository 518 that is continuously updated or refreshed with high quality web page snapshots that may be provided as search results. These snapshots are provided to webpage snapshot repository 518 by snapshot generator 520. Snapshot generation will be described in further detail in the paragraphs below.

Once search snapshots unit 510 receives snapshots associated with the web page URLs, these are then provided to search query unit 504. Search query unit 504 renders the query suggestions in a first display area, the snapshots in the form of web page previews that are viewable and actionable and link to their corresponding web page URLs, and the rich result(s), if applicable, for display at the user device.

If search query unit 504 receives updates to the input or the search query, then search query unit 504 will instruct search suggestion unit 506, search results unit 508, and search snapshots unit 510 accordingly to retrieve updated results if applicable. Similarly, if search query unit 504 receives input in the form of a selection of a particular search query from a list of query suggestions, query unit 504 will instruct search suggestion unit 506, search results unit 508, and search snapshots unit 510 accordingly to retrieve updated results as well.

Figure 6:
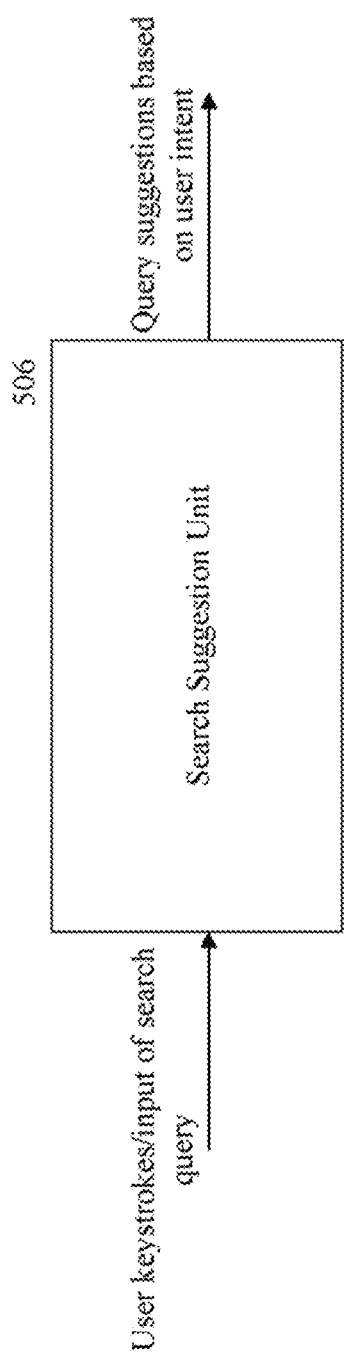
FIG. 6 depicts inputs and outputs of a search suggestion unit in accordance with an embodiment of the present disclosure.

FIG. 6 depicts inputs and outputs of a search suggestion unit in accordance with an embodiment of the present disclosure. Search suggestion unit 506 receives as input, user keystrokes/input representing a search query. Search suggestion unit 506 continuously receives user keystrokes or input as it changes so that the query suggestions generated by search suggestion unit 506 may be up to date and update as a user changes their input or search query in real time. Search suggestion unit 506 analyzes the varying input as needed and determines different query suggestions using possible user intents as the basis for determining relevant query suggestions from search suggestions database 512.

More specifically, intents are collected by search suggestions database 512 as processed intent events, each intent event annotated with specific associated queries. Search suggestion unit 506 utilizes the annotations of each intent event in order to suggest and rank the query suggestions. Additionally, the first ranked query suggestion is provided as a most relevant instant answer to the user input, and may be selected as a default query suggestion for the basis of providing the web page previews and rich result. Thus, search suggestion unit 506 outputs query suggestions based on user intent.

Figure 7:
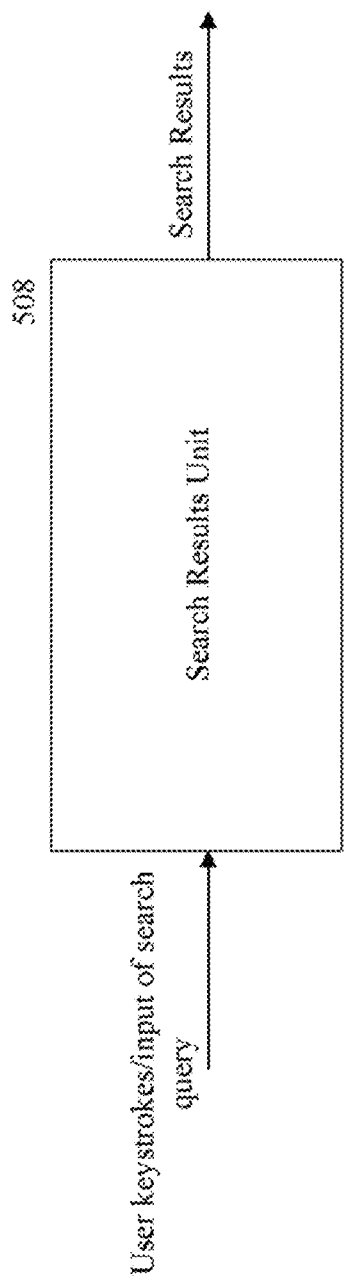
FIG. 7 depicts inputs and outputs of a search results unit in accordance with an embodiment of the present disclosure.

FIG. 7 depicts inputs and outputs of a search results unit in accordance with an embodiment of the present disclosure. Search results unit 508 receives as input, user keystrokes/input representing a search query and selected query suggestion. Search results unit 508 continuously receives user keystrokes or input as it changes so that rich results and web page URLs provided to associate with snapshots by search snapshots unit 510 may be updated as a user changes their input or search query in real time. Search results unit 508, on the basis of a given selected query suggestion and associated meta data, attempts to fetch a rich result from vertical backends 514. Search results unit also users a selected query suggestion to retrieve associated web page URLs which may then be associated with web page snapshots of those web page URLs to provide as web page previews. The determination of a rich result and provision of web page previews can be performed in parallel. Thus, search results unit 508 outputs search results, including rich results and web page previews. Search results unit 508, also, as an intermediate step, may output web page URLs so that search snapshots unit 510 may associate snapshots from webpage snapshot repository 518.

Figure 8:
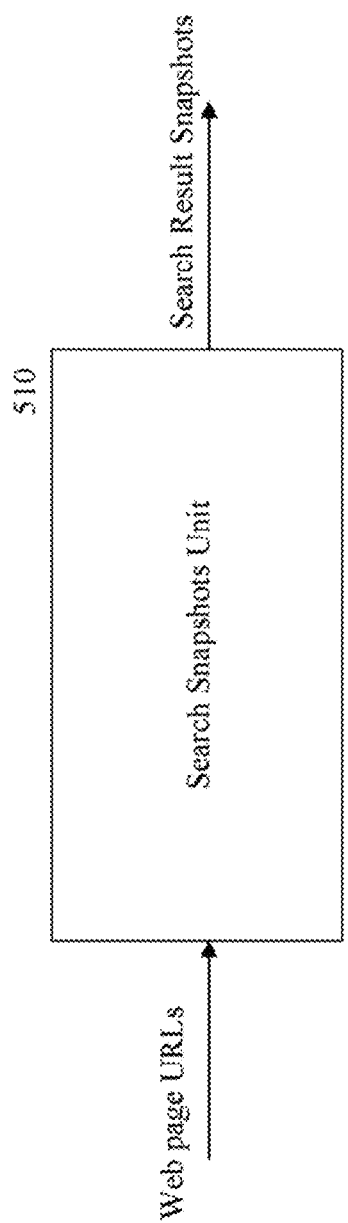
FIG. 8 depicts inputs and outputs of a search snapshots unit in accordance with an embodiment of the present disclosure.

FIG. 8 depicts inputs and outputs of a search snapshots unit in accordance with an embodiment of the present disclosure. Search snapshots unit 510 receives as input, web page URLs identified by search results unit 508 as relevant web pages to return as search results to the user. Search results unit 510 determines snapshots that correspond with the web page URLs, and returns as output, these snapshots to be provided as web page previews.

Figure 9:
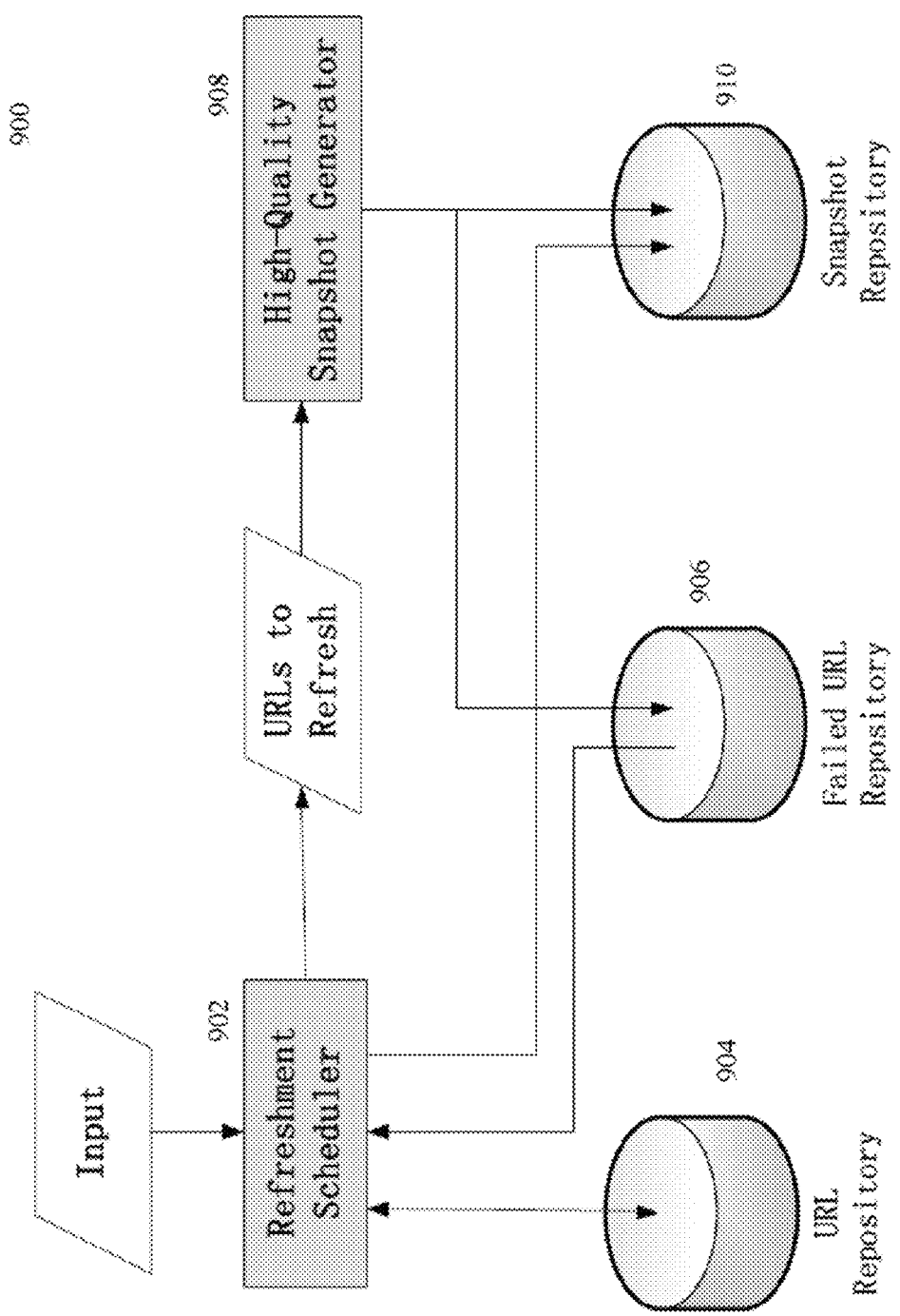
FIG. 9 depicts a high level exemplary system diagram of a system for providing refreshed high quality web page snapshots in accordance with an embodiment of the present disclosure.

FIG. 9 depicts a high level exemplary system diagram of a system for providing refreshed high quality web page snapshots in accordance with an embodiment of the present disclosure. The system 900 shown by FIG. 9 may be implemented as a stand-alone system for refreshment and generation of snapshots, or may be implemented on the back-end of a search engine or other type of web server. System 900 provides the snapshots that are used by search snapshots unit 510 to associated snapshots with web page URLs and provide these snapshots as web page previews that are viewable and actionable. System 900 receives web page URLs as input. These web page URLs are URLs that are new to the URL Repository 904 and require snapshots to be generated, or they may be web page URLs which already have associated snapshots which require refreshing or updating. This input is received by refreshment scheduler 902. The web page URLs which are already associated with snapshots but require refreshing or updating are provided to refreshment scheduler 902 by URL repository 904. Refreshment scheduler 902 analyzes the received input URLs and schedules refreshment of the URLs by analyzing URL attributes, assigning importance scores to each URL, and selecting which URLs should be refreshed. Input is received at refreshment scheduler 902 at predetermined intervals.

In another embodiment, refreshment scheduler 902 may also receive as input, URLs from failed URL repository 906. Failed URL repository 906 stores a list of URLs that were scheduled for refreshment, but had errors associated with generation of snapshots corresponding to the URLs. The re-input of URLs from failed URL repository 906 allows refreshment scheduler 902 a chance to reevaluate these URLs and determine if they could be eligible for generation of a refreshed snapshot.

Refreshment scheduler 902 analyzes each input URL and determines certain URL attributes of the URLs including whether the URL is new, how many times a URL has been clicked or accessed, whether the URL is a recently failed URL, and whether snapshot generation was previously successful for the URL. These attributes are used to assign an importance score to each URL. For example, a URL that is new is given a high importance score since there is no snapshot associated with a new URL. Similarly, a URL that is clicked or accessed very often should be assigned a high importance score due to the amount of traffic to the URL, it is likely that the URL would appear often in search results. On the contrary, if a particular URL has not been clicked or accessed for a long period of time, then this URL should be assigned a low importance score. Based on the importance scores assigned to the URLs, refreshment scheduler 902 selects URLs, which have an associated importance score higher than an importance score threshold, to be refreshed. Refreshment scheduler 902 sends back the remaining URLs to either URL repository 904 or failed URL repository 906.

The URLs selected for refreshment by refreshment scheduler 902 are forwarded to high quality snapshot generator 908. High quality snapshot generator 908 receives as input the selected URLs for snapshot generation. The URLs represent web page URLs for which high quality snapshot generator 908 will attempt to generate snapshots. Of the generated snapshots, high quality snapshot generator 908 will select the snapshots that pass a threshold test and mark them as high quality snapshots. The high quality snapshots are output by high quality snapshot generator 908 and may be stored for retrieval as search results when needed. The successfully generated snapshots that are deemed high quality snapshots are sent to snapshot repository 910 for storage. These snapshots in snapshot repository 910 may be retrieved and provided as viewable and actionable search results that link to corresponding web page URLs. The URLs whose snapshots could not be generated and the URLs whose snapshots were not in high quality are transmitted to failed URL repository 906 for storage. These URLs, as mentioned above, may be re-input to refreshment scheduler 902 to reattempt snapshot generation and refreshment.

Figure 10:
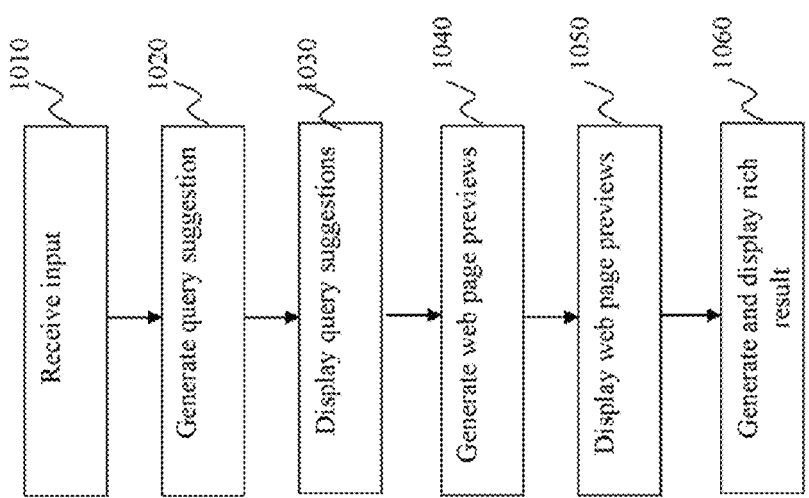
FIG. 10 depicts a flowchart of an exemplary process in which search previews are provided and displayed in accordance with an embodiment of the present disclosure.

FIG. 10 depicts a flowchart of an exemplary process in which search previews are provided and displayed in accordance with an embodiment of the present disclosure. At 1010, at least one input is received. The input may be received at a user device through a web browser environment or through a searching application. The input may also be received by a search engine such as search engine 500 displayed in FIG. 5. The at least one input may include a keyword, a search term, and number of characters, any number of numerals, any number of words, phrases, abbreviations, acronyms, stock ticker symbols, website addresses, or any combination thereof.

At 1020, based on the received at least one input, at least one query suggestion is generated. These query suggestions are generated based on the at least one input and represents common or frequently used query inputs in association with the current input. The query suggestions are ranked in order of relevance and based upon a determination of user intent. Search suggestions database 512 includes query suggestions based on user intent. More specifically, the query suggestions that will be generated are based upon data that has been aggregated and modeled such that the query suggestions serve as predictive indicators of the search terms or keywords that a user may want to use as the basis for their search. The query suggestions stored at search suggestions database 512 are collected through offline data mining procedures.

Thus, to generate the at least one query suggestion, an intent must be determined based on the at least one input. At least one query suggestion associated with the intent is determined. The at least one query suggestion may then be provided for display.

At 1030, the at least one query suggestion is displayed in a first display area of a user device.

At 1040, at least one web page preview based on the at least one input is generated. The web page previews are generated by determining at least one web page result based on the at least one input. Web page snapshots associated with each of the at least one web page result are determined, for example, by search snapshots unit 510. Each web page snapshot is associated with a corresponding web page preview of the at least one web page preview. The at least one web page preview may be provided for display.

At 1050, the at least one web page preview is displayed in a second display area of a user device. The web page preview, in the form of a snapshot is viewable and actionable and provides a link to its corresponding web page URL.

At 1060, a rich result may be generated and displayed. Generation and display of a rich result is also based on the at least one input. The rich result represents a targeted search result associated with the at least one input. The rich result may be displayed in a third display area of a user device.

In an embodiment, steps 1020, 1030, 1040, 1050, and 1060 may be performed substantially in parallel such that all displays may be provided to a user simultaneously and in real time as a user types or enters an input representing a search term for web page search results.

The second display area including the at least one web page preview is navigable based on detection of an input within the second display area, the input representing coordinates within the second display area. An input may be entered by a peripheral device such as a keyboard or mouse, or through touch or tactile means, such as capacitive, resistive, or wave form inputs to a certain part of a display having coordinates.

Figure 11:
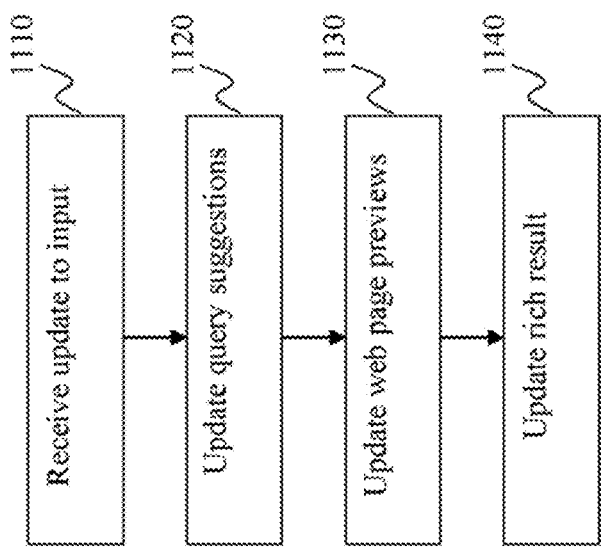
FIG. 11 depicts a flowchart of an exemplary process in which search previews are updated in accordance with an embodiment of the present disclosure.

FIG. 11 depicts a flowchart of an exemplary process in which search previews are updated in accordance with an embodiment of the present disclosure. At 1110, an update to an input is received at a user device through a web browser environment or through a searching application.

At 1120, query suggestions are updated based on the updated input. At 1130, web page previews are updated based on the updated input. At 1140, a rich result may be updated based on the updated input. Steps 1120, 1130, and 1140 may be, and preferably are performed in parallel to ensure that results are provided to users in real time and continuously as they type or enter their search query input.

Figure 12:
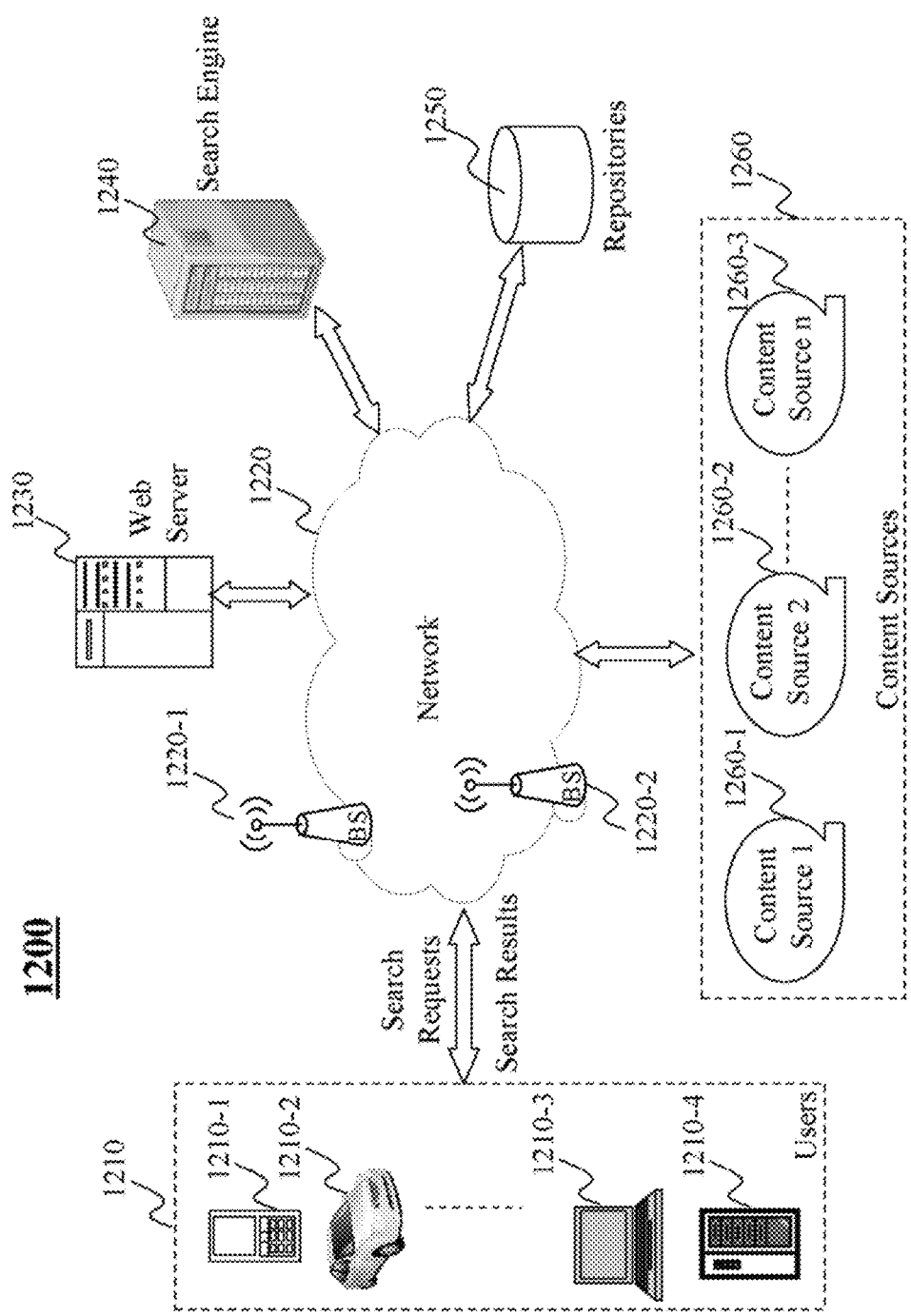
FIG. 12 is a high level depiction of an exemplary system 1200 in which a web server and search engine are deployed to provide search previews as search results, in accordance with an embodiment of the present disclosure.

FIG. 12 is a high level depiction of an exemplary system 1200 in which a web server and search engine are deployed to provide search previews as search results, in accordance with an embodiment of the present disclosure. Exemplary system 1200 includes users 1210, network 1220, web server 1230, content sources 1260, search engine 1240, and repositories 1250. Network 1220 can be a single network or a combination of different networks. For example, a network may be a local area network (LAN), a wide area network (WAN), a public network, a private network, a proprietary network, a Public Telephone Switched Network (PTSN), the Internet, a wireless network, a virtual network, or any combination thereof. A network may also include various network access points, e.g., wired or wireless access points such as base stations or Internet exchange points 1220-1, . . . , 1220-2, through which a data source may connect to in order to transmit information via the network.

Users 1210 may be of different types such as users connected to the network via desktop connections (1210-4), users connecting to the network via wireless connections such as through a laptop (1210-3), a handheld device (1210-1), or a built-in device in a motor vehicle (1210-2). A user may run applications and data provided by web server 1230, search engine 1240, or any of content sources 1260. Thus, applications and data may be provided from web server 1230, search engine 1240, or any of content sources 1260 through network 1220. Once a user is running an application on their device, the user may send instructions or search requests via the application to web server 1230, search engine 1240, or any of content sources 1260 through network 1220. Users 1210 may additionally submit search requests to web server 1230 or search engine 1240 without usage of an application. Based on the search requests, to web server 1230 or search engine 1240 may provide search results to users 1410. The search results may be presented to include query suggestions in a first display area, web page previews with snapshots being viewable and actionable links to web page URLs in a second display area, and rich results in a third display area.

The content sources 1260 include multiple content sources 1260-1, 1260-2, . . . , 1260-3. A content source may correspond to a web page host corresponding to an entity, whether an individual, a business, or an organization such as the USPTO represented by USPTO.gov, a content provider such as Yahoo.com, or a content feed source such as Twitter or blog pages. It is understood that any of these content sources may be associated with search results provided to users 1210. For example, a search result may include a snapshot linking to a content source. When a user activates the snapshot, the user will then be provided with a web browser view of the web page of the content source. web server 1230 or search engine 1240 may access information from any of content sources 1260 and rely on such information to generate query suggestions, web page previews, rich results, web page snapshots, respond to search requests, and provide search results. Web server 1230 or search engine 1240 may also access additional information, via network 1220, stored in repositories 1250, which may contain a snapshot repository including high quality snapshots that have been generated and deemed worthy of presentation as search results, as well as a failed URL repository which lists web page URLs where snapshot generation was not possible, or where the snapshots generated did not meet a high quality threshold to be stored in snapshot repository. Repositories 1250 may also include a search suggestions database and searchable index database.

In exemplary system 1200, search engine 1240 or web server 1230 receives at least one input. Based on the input, query suggestions are generated, and may be displayed in a first display area of a user device. At least one web page preview is generated based on the input, and may be displayed in a second area of the user device. Each web page preview is viewable and actionable and provides a link to a corresponding web page URL. Rich results, if available, may also be generated based on the input and provided for display in a third display area of the user device.

Figure 13:
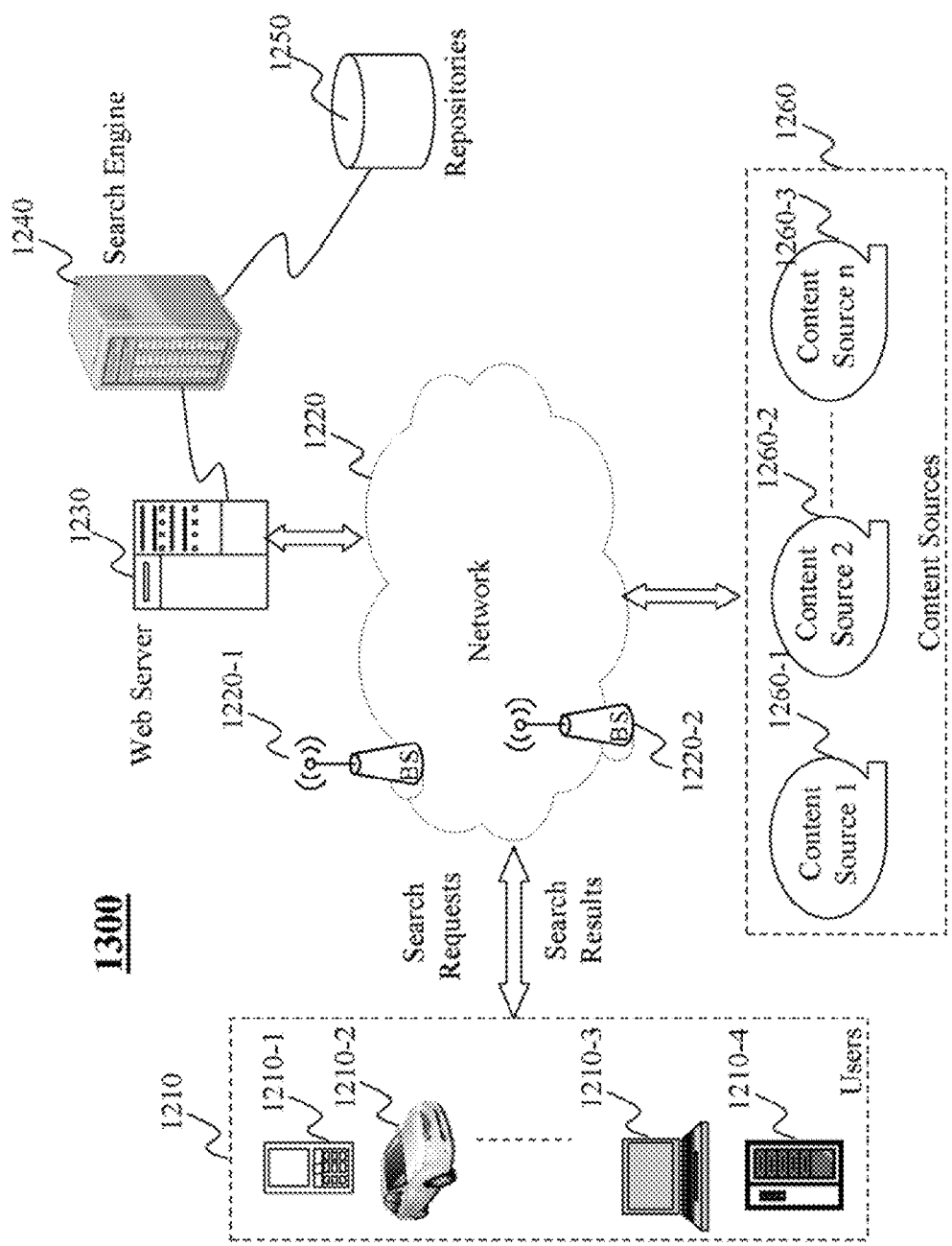
FIG. 13 is a high level depiction of an exemplary system 1300 in which a web server and search engine are deployed to provide search previews as search results, in accordance with an embodiment of the present disclosure.

FIG. 13 is a high level depiction of an exemplary system 1300 in which a web server and search engine are deployed to provide search previews as search results, in accordance with an embodiment of the present disclosure. In this embodiment; search engine 1240 serves as a backend system of web server 1230. All communication to and from search engine 1240 is sent and received through web server 1230.

To implement the embodiments set forth herein, computer hardware platforms may be used as hardware platform(s) for one or more of the elements described herein (e.g., web server 1330, search engine 1340, search query unit 504, search suggestion unit 506, search results unit 508, search snapshots unit 510.). The hardware elements, operating systems and programming languages of such computer hardware platforms are conventional in nature, and it is presumed that those skilled in the art are adequately familiar therewith to adapt those technologies to implement any of the elements described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment, and as a result the drawings are self-explanatory.

Figure 14:
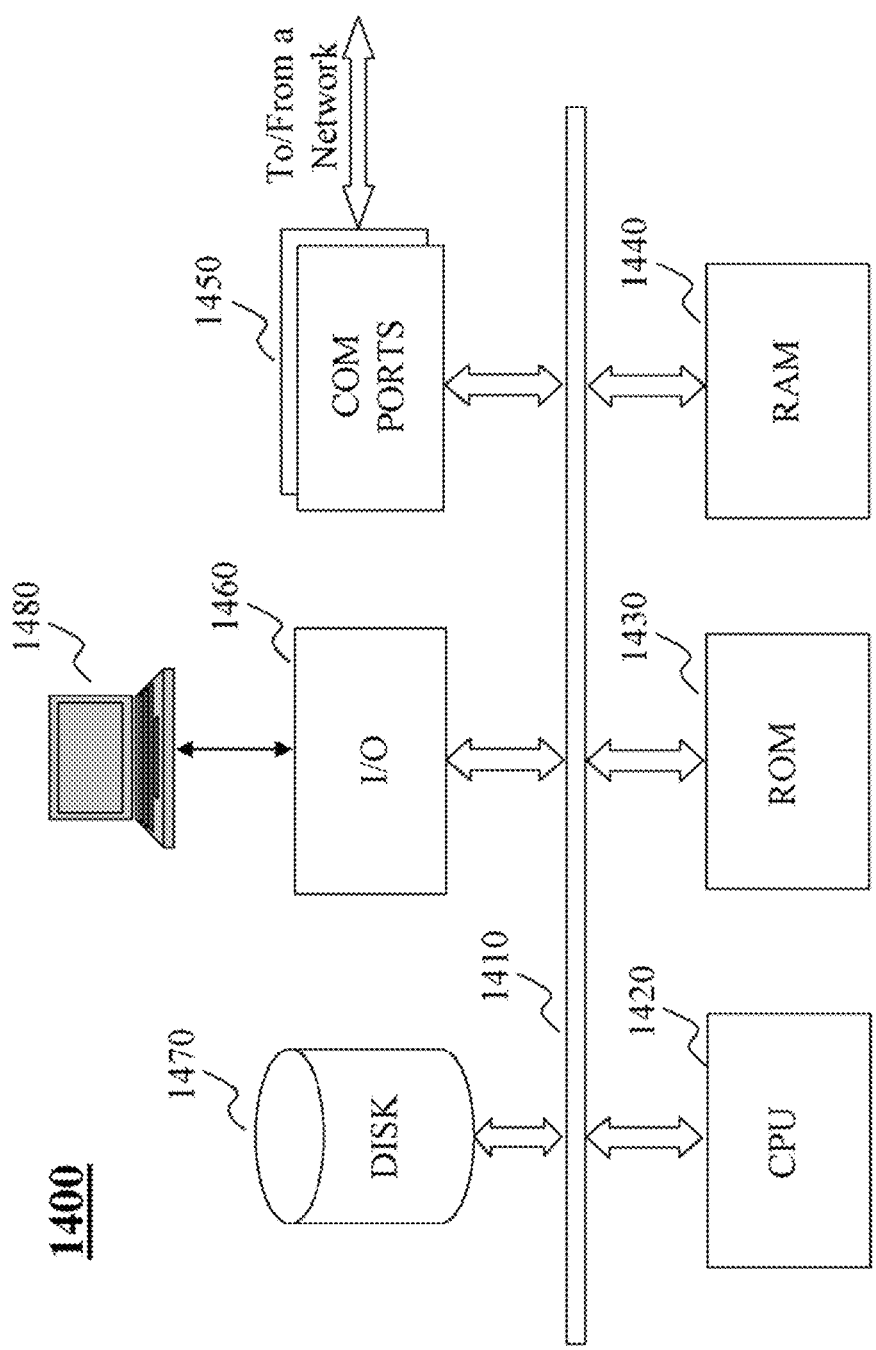
FIG. 14 depicts a general computer architecture on which the present embodiments can be implemented and has a functional block diagram illustration of a computer hardware platform which includes user interface elements.

FIG. 14 depicts a general computer architecture on which the present embodiments can be implemented and has a functional block diagram illustration of a computer hardware platform which includes user interface elements. The computer may be a general purpose computer or a special purpose computer. This computer 1400 can be used to implement any components of the development and hosting Platform described herein. For example, the generation of query suggestions, web page previews, and rich results, can all be implemented on a computer such as computer 1400, via its hardware, software program, firmware, or a combination thereof. Although only one such computer is shown, for convenience, the computer functions relating to development and hosting of applications may be implemented in a distributed fashion on a number of similar platforms, to distribute the processing load.

The computer 1400, for example, includes COM ports 1450 connected to and from a network connected thereto to facilitate data communications. The computer 1400 also includes a central processing unit (CPU) 1420, in the form of one or more processors, for executing program instructions. The exemplary computer platform includes an internal communication bus 1410, program storage and data storage of different forms, e.g., disk 1470, read only memory (ROM) 1430, or random access memory (RAM) 1440, for various data files to be processed and/or communicated by the computer, as well as possibly program instructions to be executed by the CPU. The computer 1400 also includes an I/O component 1460, supporting input/output flows between the computer and other components therein such as user interface elements 1480. The computer 1400 may also receive programming and data via network communications.

Hence, aspects of the methods of developing, deploying, and hosting applications that are interoperable across a plurality of device platforms, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated schedules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a server or host computer into the hardware platform(s) of a computing environment or other system implementing a computing environment or similar functionalities in connection with generating explanations based on user inquiries. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media includes dynamic memory, such as a main memory of such a computer platform. Tangible transmission media includes coaxial cables, copper wire, and fiber optics, including wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic take, any other magnetic medium, a CD-ROM, DVD or DVD-ROM, any other optical media, punch card paper tapes, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the embodiments of the present disclosure are amenable to a variety of modifications an/or enhancements. For example, although the implementation of various components described above may be embodied in a hardware device, it can also be implemented as a software only solution—e.g., an installation on an existing server. In addition, the dynamic relation/event detector and its components as disclosed herein can be implemented as firmware, a firmware/software combination, a firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim and all applications, modifications and variations that fall within the true scope of the present teachings.

The invention claimed is:

1. A method implemented on a computing device, the computing device having at least one processor, storage, and a communication platform connected to a network for providing search previews, the method comprising:
   receiving a first input;
   generating a first query suggestion based on the first input;
   providing the first query suggestion to be displayed in a first display area;
   determining whether a URL repository comprises a first web page URL of a first web page associated with the first query suggestion;
   responsive to a determination that the URL repository comprises the first web page URL, determining whether a first web page preview linked to the first web page should be refreshed based on a first importance score associated with the first web page preview;
   responsive to a determination that the first importance score indicates that the first web page preview should be refreshed, refreshing the first web page preview, wherein the first web page preview comprises a first web page snapshot of the first web page;
   marking the first web page snapshot as a high quality snapshot when the first web page snapshot passes a threshold test;
   continuously attempting refreshment of the first web page snapshot when the first web page snapshot fails the threshold test;
   providing the first web page preview to be displayed in a second display area;
   generating a second web page preview linked to a second web page associated with the first query suggestion, wherein the second web page preview comprises a second web page snapshot of the second web page;
   providing the second web page preview to be displayed in the second display area;
   determining whether a rich result exists and can be displayed, wherein the rich result comprises a targeted search result with a predetermined association with the first query suggestion; and
   responsive to a determination that the rich result exists and can be displayed, providing the rich result to be displayed in a third display area, wherein the first query suggestion, the first and second web page previews, and the rich result are to be displayed simultaneously.

2. The method of claim 1, further comprising:
   receiving an update to the first input;
   updating the first query suggestion and display thereof in the first display area based on the updated first input; and
   updating the first web page preview and display thereof in the second display area based on the updated first input.

3. The method of claim 1, wherein generating the first query suggestion comprises:
   determining an intent based on the at least one input;
   determining the first query suggestion based on the intent; and
   providing the first query suggestion for display.

4. The method of claim 1, wherein generating the first web page preview comprises:
   determining a first web page result based on the first input;
   determining the first web page snapshot associated with the first web page result;
   associating the first web page snapshot with the first web page preview; and
   providing the first web page preview for display.

5. The method of claim 1, wherein the second display area including the first web page preview is navigable based on detection of an input within the second display area, the input associated with coordinates within the second display area.

6. The method of claim 1, wherein the first display area and the second display area are part of a combined display area that is invisible and embedded within a browser environment displayed on a display of the computing device, wherein the combined display area becomes visible in the browser environment in response to detection of a triggering event.

7. A machine readable non-transitory and tangible medium having information recorded for providing search previews, wherein the information, when read by the machine, causes the machine to perform the steps comprising:
   receiving a first input;
   generating a first query suggestion based on the first input;
   providing the first query suggestion to be displayed in a first display area;
   determining whether a URL repository comprises a first web page URL of a first web page associated with the first query suggestion;
   responsive to a determination that the URL repository comprises the first web page URL, determining whether a first web page preview linked to the first web page should be refreshed based on a first importance score associated with the first web page preview;
   responsive to a determination that the first importance score indicates that the first web page preview should be refreshed, refreshing the first web page preview, wherein the first web page preview comprises a first web page snapshot of the first web page;
   marking the first web page snapshot as a high quality snapshot when the first web page snapshot passes a threshold test continuously attempting refreshment of the first web page snapshot when the first web page snapshot fails the threshold test providing the first web page preview to be displayed in a second display area;

generating a second web page preview linked to a second web page associated with the first query suggestion, wherein the second web page preview comprises a second web page snapshot of the second web page;

providing the second web page preview to be displayed in the second display area;

determining whether a rich result exists and can be displayed, wherein the rich result comprises a targeted search result with a predetermined association with the first query suggestion; and responsive to a determination that the rich result exists and can be displayed, providing the rich result to be displayed in a third display area, wherein the first query suggestion, the first and second web page previews, and the rich result are to be displayed simultaneously.

8. The machine readable non-transitory and tangible medium of claim 7, wherein the information, when read by the machine, further causes the machine to perform the steps comprising:

receiving an update to the first input;

updating the first query suggestion and display thereof in the first display area based on the updated first input; and updating the first web page preview and display thereof in the second display area based on the updated first input.

9. The machine readable non-transitory and tangible medium of claim 7, wherein the step of generating the first query suggestion comprises:

determining an intent based on the at least one input;

determining the first query suggestion based on the intent; and providing the first query suggestion for display.

10. The machine readable non-transitory and tangible medium of claim 7, wherein the step of generating the first web page preview comprises:

determining a first web page result based on the first input;

determining the first web page snapshot associated with the first web page result;

associating the first web page snapshot with the first web page preview; and providing the first web page preview for display.

11. The machine readable non-transitory and tangible medium of claim 7, wherein the second display area including the first web page preview is navigable based on detection of an input within the second display area, the input associated with coordinates within the second display area.

12. The machine readable non-transitory and tangible medium of claim 7, wherein the first display area and the second display area are part of a combined display area that is invisible and embedded within a browser environment displayed on a display of the computing device, wherein the combined display area becomes visible in the browser environment in response to detection of a triggering event.

13. A system comprising at least one processor, storage, and a communication platform connected to a network for providing search previews, comprising:

a search query unit for receiving a first input;

a search suggestion unit for determining a first query suggestion based on the first input;

a search results unit for generating a first web page preview linked to a first web page associated with the first query suggestion and generating a second web page preview linked to a second web page associated with the first query suggestion, wherein the first web page preview comprises a first web page snapshot of the first web page and the second web page preview comprises a second web page snapshot of the second web page, wherein generating the first web page preview comprises:

determining whether a URL repository comprises a first web page URL of the first web page associated with the first query suggestion, responsive to a determination that the URL repository comprises the first web page URL, determining whether the first web page preview linked to the first web page should be refreshed based on a first importance score associated with the first web page preview, responsive to a determination that the first importance score indicates that the first web page preview should be refreshed, refreshing the first web page preview, marking the first web page snapshot as a high quality snapshot when the first web page snapshot passes a threshold test, and continuously attempting refreshment of the first web page snapshot when the first web page snapshot fails the threshold test; and a display unit for providing for display the first query suggestion in a first display area, providing for display the first web page preview in a second display area, and providing for display the second web page preview in the second display area;

wherein the search results unit is further configured for determining whether a rich result exists and can be displayed, wherein the rich result comprises a targeted search result with a predetermined association with the first query suggestion; and responsive to a determination that the rich result exists and can be displayed, providing the rich result to be displayed in a third display area, wherein the first query suggestion, the first and second web page previews, and the rich result are to be displayed simultaneously.

14. The system of claim 13, wherein the search query unit is further configured for receiving an update to the first input;

updating the first query suggestion and display thereof in the first display area based on the updated first input; and updating the first web page preview and display thereof in the second display area based on the updated first input.

15. The system of claim 13, wherein the search query unit is configured for determining an intent based on the at least one input;

determining the first query suggestion based on the intent; and providing the first query suggestion for display.

16. The system of claim 13, wherein the search results unit is further configured for determining a first web page result based on the first input; determining the first web page snapshot associated with the first web page result; associating the first web page snapshot with the first web page preview; and providing the first web page preview for display.

17. The system of claim 13, wherein the second display area including the first web page preview is navigable based on detection of an input within the second display area, the input associated with coordinates within the second display area.

18. The system of claim 13, wherein the first display area and the second display area are part of a combined display area that is invisible and embedded within a browser environment displayed on a display of the computing device, wherein the combined display area becomes visible in the browser environment in response to detection of a triggering event.

19. The method of claim 1, further comprising:
determining the first importance score based on one or more of: whether the first web page URL is new, a number of times the first web page URL has been accessed, whether the first web page URL is a recently failed URL, or whether the first web page preview has been previously successfully generated.

20. The method of claim 1, further comprising:
responsive to a determination that the URL repository does not comprise the first web page URL, generating the first web page preview based on the first web page URL.

21. The method of claim 1, wherein whether the rich result can be displayed is determined based on display space of the computing device.

* * * * *